United States Patent
Suppes et al.

(10) Patent No.: US 12,444,099 B2
(45) Date of Patent: Oct. 14, 2025

(54) SYSTEMS AND METHODS FOR COMPUTED TOMOGRAPHY INACCURACY COMPENSATION

(71) Applicant: Baker Hughes Holdings LLC, Houston, TX (US)

(72) Inventors: Alexander Suppes, Garbsen (DE); Pavel Blazek, Hannover (DE)

(73) Assignee: Baker Hughes Holdings LLC, Houston, TX (US)

( * ) Notice: Subject to any disclaimer, the term of this patent is extended or adjusted under 35 U.S.C. 154(b) by 278 days.

(21) Appl. No.: 18/210,341

(22) Filed: Jun. 15, 2023

(65) Prior Publication Data
US 2024/0420386 A1      Dec. 19, 2024

(51) Int. Cl.
*G06T 11/00* (2006.01)
*G01N 23/046* (2018.01)
*G01N 23/083* (2018.01)

(52) U.S. Cl.
CPC .......... *G06T 11/005* (2013.01); *G01N 23/046* (2013.01); *G01N 23/083* (2013.01);
(Continued)

(58) Field of Classification Search
CPC .... G06T 11/005; G06T 11/006; G06T 11/003; G06T 2211/421; G06T 5/50; G06T 5/80;
(Continued)

(56) References Cited

U.S. PATENT DOCUMENTS 5,119,408 A * 6/1992 Little ................. G01N 23/046
                                                           378/10
5,319,693 A * 6/1994 Eberhard ............ G01N 23/046
                                                           378/19
(Continued)

FOREIGN PATENT DOCUMENTS

| JP | 2005270297 A | 10/2005 |
|----|--------------|---------|
| JP | 2019128337 A | 8/2019 |
| JP | 2020186913 A | * 11/2020 |

OTHER PUBLICATIONS

International Search Report and Written Opinion received for PCT Patent Application No. PCT/US2024/033198, mailed on Sep. 24, 2024, 9 pages.

*Primary Examiner* — Irakli Kiknadze
(74) *Attorney, Agent, or Firm* — Mintz, Levin, Cohn, Ferris, Glovsky and Popeo, P.C. US (57) ABSTRACT

A computed tomography (CT) system including a scanning unit having an x-ray emitter, a detector arranged to receive x-rays emitted from the x-ray emitter during a scanning operation, and a manipulating unit arranged to rotate an object about a rotational axis and move the object through a plurality of positions along a path, defined by the rotational axis, in between the x-ray emitter and the detector. The CT system can also include a computing device, including a memory storing computer-executable instructions and at least one data processor. The processor is arranged to execute the instructions, which cause the processor to perform operations including: receiving, from the scanning
(Continued)

unit, first data characterizing the path, and receiving, from the scanning unit, second data characterizing the one or more x-ray images of the object at at least one position of the plurality of positions, determining a compensation to be applied to the second data based on the first data, reconstructing an image of the object based on the first data, the second data, and the compensation, and providing the reconstructed image.

20 Claims, 6 Drawing Sheets

(52) U.S. Cl.
 CPC .............. *G01N 2223/3306* (2013.01); *G01N 2223/501* (2013.01)

(58) Field of Classification Search
 CPC ............... G06T 7/0012; G06T 3/00; G06T 2207/10116; G06T 2200/24; G06T 2207/30168; G01N 23/083; G01N 23/046; G01N 2223/501; G01N 2223/3306; G01N 2223/308; G01N 2223/3303; G01N 23/04; G01N 2223/419; G01N 2223/303; G01N 33/24; G01N 23/223; G01N 23/2206; G01N 23/00; A61B 6/584; A61B 6/585; A61B 6/4441; A61B 6/588; A61B 6/032; A61B 6/5258; A61B 6/027; A61B 6/4078; A61B 6/4085; A61B 6/4071; A61B 6/54; A61B 6/5205; A61B 6/482; A61B 6/5223; A61B 6/08; A61B 6/4021; A61B 6/5294; A61B 6/4452; A61B 6/486; A61B 8/5223; A61B 6/4233; A61B 6/586; A61B 6/542; A61B 6/469; A61B 6/587; A61B 6/4405; A61B 6/5229; A61B 6/4429; A61B 6/035; A61B 6/037; A61B 6/40; A61B 6/4014; A61B 6/4064; A61B 6/44; A61B 6/06; A61B 6/022; A61B 6/481; A61B 6/4208; A61B 6/4447; A61B 6/589; A61B 6/4476; A61B 6/5241; A61B 6/03; A61B 6/5282; A61B 6/583; A61B 6/5235; A61B 6/4435; A61B 6/4007; A61B 6/42; A61B 6/52; G01T 7/005; G01T 1/169; G01T 1/2985; G03B 42/02; H05G 1/26; G16H 50/30; G01V 5/228; G01V 5/226; G01V 5/22; G01B 15/00; G01B 21/04
 USPC ................... 378/4, 20, 68, 198, 208, 19
 See application file for complete search history.

(56) References Cited

U.S. PATENT DOCUMENTS

| | | | |
|---|---|---|---|
| 7,792,242 B2* | 9/2010 | Kamegawa | G01N 23/046 378/207 |
| 8,068,579 B1* | 11/2011 | Yun | G01N 23/046 378/4 |
| 9,488,605 B2* | 11/2016 | Feser | G01N 33/24 |
| 2005/0123089 A1* | 6/2005 | Man | G01N 23/046 378/4 |
| 2019/0302285 A1* | 10/2019 | Sato | G01N 23/04 |

* cited by examiner

SYSTEMS AND METHODS FOR COMPUTED TOMOGRAPHY INACCURACY COMPENSATION

TECHNICAL FIELD

The subject matter described herein relates to systems and methods for computed tomography inaccuracy compensation.

BACKGROUND

Industrial computed tomography (CT) scanning is a method of producing three-dimensional internal and external representations of a scanned object using irradiation. To obtain accurate three-dimensional representations of the scanned object, it may be required to capture a plurality of scans of the object from various angles and locations. In the known CT scanning method, a source emits signals, including, but not limited to, X-ray, radio frequency, or sonar signals, toward the object to be scanned. The emitted signals interact with the object and generate a response signal that can be received by at least one detector. The detected response signal can be used to generate an image of the object. In known CT systems, the object can be rotated with respect to the X-ray source and the detector array so that the angle at which the X-ray beam intersects the subject constantly changes. The detector produces a plurality of projection images corresponding to each rotation location of the object. The projection images can be further used to reconstruct a 3D image of the scanned object. The quality and efficiency of the reconstructed image are important to the overall effectiveness of the CT system Industrial CT scanning can be used in a variety of industries for internal inspection of components, flaw detection, failure analysis, and assembly analysis. In conventional industrial CT scanning, an object to be scanned is placed on a rotary table between an X-ray source and a detector. By rotating the table, the object is brought into various positions relative to the source, resulting in X-rays penetrating the object from different directions. The X-rays passing through the object are attenuated, and the resulting irradiance distribution is detected by the detector. The detector produces projection images corresponding to each irradiance distribution. By applying known rotation angle positions and reconstruction methods to the acquired projection images, a 3D image of the object can be calculated.

During a CT scanning operation, however, it can be desirable to move an object closer to or further away from the X-ray emitter to increase a level of magnification of the object to increase the accuracy of the images generated. In some cases, however, the path of the movement of the object that is perceived by the CT scanner can change over time, as a result of the focal point of the emitter of the CT scanner shifting. This shifting (referred to herein as focal point shift) can occur as a result of thermal expansion within the emitter, or another factor.

SUMMARY

In one aspect, a system for compensating for inaccuracies in a CT scan is provided. In some embodiments, the system can include a scanning unit, an x-ray emitter, a detector configured to receive x-rays emitted from the x-ray emitter during a scanning operation, and a manipulating unit configured to rotate an object about a rotational axis and move the object through a plurality of positions along a path, defined by the rotational axis, in between the x-ray emitter and the detector, while capturing one or more x-ray images of the object. The system can also include a computing device, including a memory storing computer-executable instructions and at least one data processor configured to execute the instructions, which cause the at least one data processor to perform operations including receiving, from the scanning unit, first data characterizing the path, receiving, from the scanning unit, second data characterizing one or more x-ray images of the object at one or more positions of the plurality of positions, determining a compensation to be applied to the second data based on the first data, reconstructing an image of the object based on the first data, the second data, and the compensation and providing the reconstructed image.

In some embodiments, the first data further includes data characterizing a distance between the x-ray emitter and the detector and at least one distance between the one or more positions and the x-ray emitter, and at least one data processor may be further configured to perform operations including determining a shift of the x-ray emitter based on the first data, and the second data. Embodiments may also include determining the compensation to be applied to the first data based on the first data, the second data and the shift of the x-ray emitter.

In some embodiments, the detector may be a digital detector array. In some embodiments, the one more x-ray images of the object at the one or more positions include a plurality of x-ray images, and the at least one data processor may be further configured to perform operations including determining, from the second data, one or more shifted positions of the object corresponding to the one or more positions of the object using a parallel rebinning. Embodiments may also include determining the compensation to be applied to the second data based on the first data and the one or more shifted positions.

In some embodiments, the plurality of positions along the path may be defined by coordinates in three-dimensional space, wherein the at least one shifted position is a vector.

In some embodiments, the object may be a calibration rod and the first data further includes data characterizing an initial angular orientation of the rotational axis at the plurality of positions along the path, and the at least one data processor may be further configured to perform operations including determining a shifted angular orientation of the rotational axis, determining, based on the first data, the second data and the shifted angular orientation, a plurality of shifted positions at a plurality locations along the shifted angular orientation of the rotational axis, and determining the compensation to be applied to the second data based on the first data, the shifted angular orientation of the rotational axis and the plurality of shifted positions.

In some embodiments, the plurality of positions along the path may be defined by coordinates in three-dimensional space, wherein the at least one shifted position may be a vector.

In some embodiments, the at least one data processor may be further configured to perform operations including determining, based on the reconstructed image, an image quality metric, and determining an updated compensation to be applied to the first data based on the image quality metric.

In another aspect, a method for compensating for inaccuracies in a CT scan is provided. In some embodiments, the method can include scanning, by a scanning unit, an object at one or more positions of a plurality of positions along a path between an x-ray emitter and a detector, the scanning unit can include the x-ray emitter, the detector, and a manipulating unit configured to rotate the object about a rotational axis and move the object through the plurality of positions along a path, defined by the rotational axis, in between the x-ray emitter and the detector, while capturing one or more x-ray images of the object. The method can also include receiving, by at least one data processor of a computing device coupled to the scanning unit and including a memory storing computer-executable instructions, first data characterizing the path, receiving, by the at least one data processor, second data characterizing one or more x-ray images of the object at one or more positions of the plurality of positions, determining, by the at least one data processor, a compensation to be applied to the second data based on the first data. The method can also include reconstructing, by the at least one data processor, an image of the object based on the first data, the second data, and the compensation, and providing the reconstructed image.

In some embodiments, the one more x-ray images of the object at the at least one position include a plurality of x-ray images, the determining of the compensation further including determining, by the at least one data processor, from the first data and the second data, one or more shifted positions of the object corresponding to the one or more positions of the object using a parallel rebinning. Embodiments may also include determining, by the at least one data processor, the compensation to be applied to the first data based on the first data, the second data and the one or more shifted positions.

In some embodiments, the first data further includes data characterizing a distance between the x-ray emitter and the detector and at least one distance between the at least one position and the x-ray emitter, the determining of the compensation further including determining, by the at least one data processor, a shifted position of the x-ray emitter based on the at least one shifted position of the object corresponding to the at least one position and the second data. Embodiments may also include determining, by the at least one data processor, the compensation to be applied to the first data based on the first data, the second data and the shift of the x-ray emitter.

In some embodiments, the object may be a rod and the first data further includes data characterizing an initial angular orientation of the rotational axis at the plurality of positions along the path, and the at least one data processor may be further configured to perform operations including determining a shifted angular orientation of the rotational axis, determining, based on the first data, the second data and the shifted angular orientation, a plurality of shifted positions at a plurality locations along the shifted angular orientation of the rotational axis, and determining the compensation to be applied to the second data based on the first data, the shifted angular orientation of the rotational axis and the plurality of shifted positions.

In some embodiments, the one or more positions along the path may be defined by coordinates in three-dimensional space, wherein the at least one shifted position may be a vector.

In some embodiments, the detector may be a digital detector array. In some embodiments, the method may include determining, by the at least one processor, based on the reconstructed image, an image quality metric. Embodiments may also include determining, by the at least one processor, an updated compensation to be applied to the first data based on the image quality metric.

In another aspect, a non-transitory computer readable medium storing computer readable instructions system for compensating for inaccuracies in a CT scan is provided. In some embodiments, the non-transitory computer readable medium can store computer readable instructions, which when executed by a data processor cause the data processor to perform operations including receiving first data characterizing a path of an object from a scanning unit, the scanning unit including an x-ray emitter, a detector, and a manipulating unit configured to rotate the object about a rotational axis and move the object through a plurality of positions along the path, defined by the rotational axis, in between the x-ray emitter and the detector, while capturing one or more x-ray images of the object. Embodiments may also include receiving second data, from the scanning unit, characterizing one or more x-ray images of the object at one or more positions of the plurality of positions, determining a compensation to be applied to the second data based on the first data, reconstructing an image of the object based on the first data, the second data, and the compensation, and providing the reconstructed image.

In some embodiments, the first data further includes data characterizing a distance between the x-ray emitter and the detector and a distance between the first position and the x-ray emitter, and the computer readable instructions further cause the at least one data processor to perform operations including determining a shift of the x-ray emitter based on the first data, and the second data. Embodiments may also include determining the compensation to be applied to the first data based on the first data, the second data and the shift of the x-ray emitter.

In some embodiments, the one more x-ray images of the object at the at least one position include a plurality of x-ray images, and the computer readable instructions further cause the at least one data processor to perform operations including determining, from the first data and the second data, one or more shifted positions of the object corresponding to the one or more positions of the object using a parallel rebinning. Embodiments may also include determining the compensation to be applied to the first data based on the first data, the second data and the one or more shifted positions.

In some embodiments, the object may be a rod and the first data further includes data characterizing an initial angular orientation of the rotational axis at the plurality of positions along the path, and the at least one data processor may be further configured to perform operations including determining a shifted angular orientation of the rotational axis, determining, based on the first data, the second data and the shifted angular orientation, a plurality of shifted positions at a plurality locations along the shifted angular orientation of the rotational axis, and determining the compensation to be applied to the second data based on the first data, the shifted angular orientation of the rotational axis and the plurality of shifted positions.

In some embodiments, the one or more positions along the path may be defined by coordinates in three-dimensional space, wherein the at least one shifted position may be a vector.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

During a CT scanning operation it can be desirable to move an object closer to or further away from the X-ray emitter to increase a level of magnification of the object to increase the accuracy of the images generated. In some cases, the path of the movement of the object at the time of manufacture can deviate from an idealized path due to manufacturing tolerances or other factors. In such a case, it can be necessary for the manufacturer to calibrate the CT scanner based on the non-ideal path to compensate for the deviations to ensure the accuracy of the scanner prior to delivering the scanner to a customer. This initial calibration can require the CT scanner to take a plurality of x-ray images of the object at many positions along the path of movement, while rotating the object about a rotational axis. From the many x-ray images, the manufacturer can identify any asymmetry and determine a shift from the idealized path for each of the many positions and determine a compensation value for each of the many positions compensate for the asymmetry, so that a clear and accurate three-dimensional CT image can be reconstructed from the plurality of x-ray images. However, the initial calibration performed at the time of manufacture can become inaccurate over time due to, for example, focal point shift of the emitter due to thermal expansion or some other factor. Focal point shift can change the path of the movement of the object that is perceived by the CT scanner by changing the angles that the x-rays are emitted from the emitter. The above described initial calibration can be cumbersome for a customer to carry out routinely throughout the life of the CT scanner. Without a simple system and method in place for routinely calibrating the CT scanner to accommodate for the change in focal point of the CT scanner, the CT scanner can become progressively more inaccurate. Accordingly, it can be desirable to have a system and method for correcting for these deviations.

The systems and methods described herein address the aforementioned shortcomings. For example, one or more embodiments of the system herein can include a system for calibrating and correcting inaccuracies in a CT scanner that arise from changes in the system over time. In some embodiments, the system can include an x-ray emission source, a detector, a manipulating unit that can be arranged to move an object being scanned within a space between the emitter and the detector, and a computing device arranged to automatically determine and compensate for a change in the focal spot position of the emitter by only having to take x-ray images of an object at a single position or by evaluating data from a CT scan.

Advantageously, the system described herein provide a user with an ability to routinely calibrate a CT system to correct for changes in the system, thus extending the life of the CT system and saving a user money, while ensuring the clarity and accuracy of scans. The systems and methods described herein further provide a user with the ability to move scanned objects during a scanning operation to enhance the level of magnification of various portions of the object to increase the resolution and accuracy of the images generated by the scanner.

Figure 1:
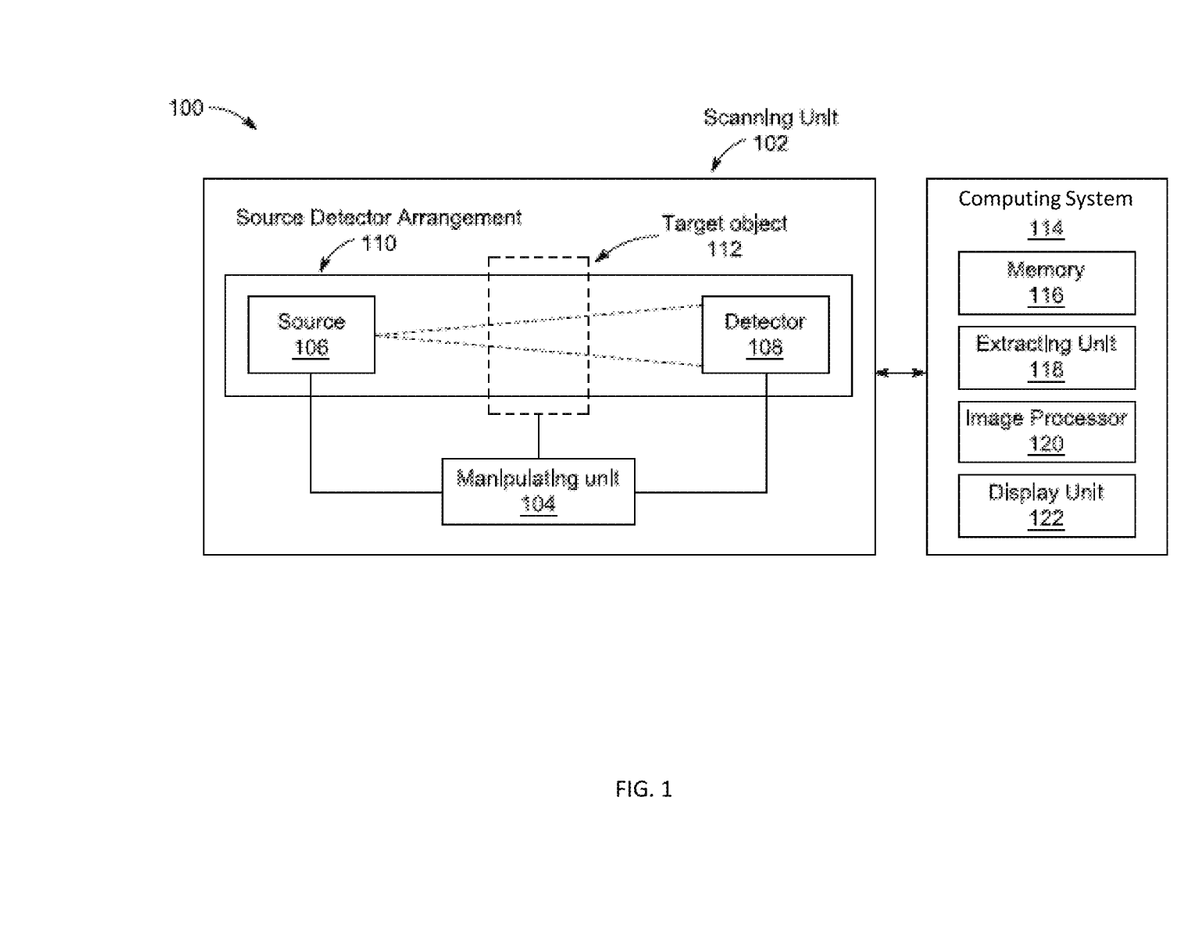
FIG. 1 is a block diagram of a system for scanning a target object.

FIG. 1 is a block diagram of a system 100 for scanning a target object at high resolution. The system 100 can include a scanning unit 102, and a computing system 114. The scanning unit 102 can include a manipulating unit 104, a source 106, and a detector 108. In some embodiments, the scanning unit 102 can include a communication circuitry (not shown), and a control unit (not shown). The scanning unit 102 can be configured to acquire data characterizing of the target object 112 or a region of interest (ROI) on the target object 112. In an embodiment, the ROI can be located at the midpoint of the target object 112 or at the boundary of the target object 112. In some embodiments, the target object 112 can be a printed circuit board, flat and/or thin composite material, a welded metal sheet, or the like, which can have one or more dimensions (e.g., length, width, thickness, or the like).

The manipulating unit 104 can be configured to move the object 112 along a scanning path, moving the object through a plurality of positions and rotating the object 112 about a rotational axis while acquiring one or more scans of the object 112 at each position. In some embodiments, the scanning path can be a linear path along one direction (e.g., moving the object 112 along a straight from the source 106 to the detector 108). However, in in reality, even a "linear path" as described above can have minor wobbles (e.g., on the order of micrometers) which can be seen as noise in the images generated if not properly compensated for, as described in greater detail below. In some embodiments, the path can be a path in two or three dimensional space, for example, a helical path, a double circle path, a circular path, and/or some other abstract path. In some embodiments, the scanning path can be defined automatically or manually. In some embodiments, the system 100 can be configured to self-train using a set of points selected from the scanning path to generate the scanning path. In an embodiment, the system 100 can be configured to implement a digital twin technology for populating the scanning path automatically. In some embodiments, the system 100 can populate a plurality of scanning path segments with more points (based on user input or automatically) to assure dense sampling of the target object 112. In some embodiments, the scanning path can include a plurality of source poses (a source pose can be a combination of position and orientation of the source 106 from the point of view of the target object 112). In an embodiment, the position or/and coordination of the plurality of source poses can be in a 2-dimensional plane and/or in a 3-dimensional plane.

In some embodiments, the manipulating unit 104 can alternatively be configured to move the source 106 and/or the detector 108 closer to or further away from the target object 112. In some embodiments, the manipulating unit 104 can be configured to change at least one geometrical position and the orientation of the target object 112 relative to the source 106. In another embodiment, the manipulating unit 104 can be configured to change at least one geometrical position and the orientation of the target object 112 and the source 106 simultaneously. In an embodiment, the manipulating unit 104 and the detector 108 can be actuated simultaneously and/or individually, as desired.

The manipulating unit 104 can include a dual axis table, such as an X-Y axis table, and the object 112 can be placed upon the table. The manipulating unit 104 can further include a component configured to move the object 112 along a third axis, such as a Z axis. The manipulating unit 104 can further include a rotation unit configured to rotate the object 112. The object 112 can be moved on a trajectory path using the manipulating unit 104 such that a plurality of x-ray images can be acquired at different magnifications resulting from varying distances between the source 106 and the object 112 as the object 112 is moved through the trajectory path. In some embodiments, the source 106 and the detector 108 can be provided in fixed locations as the object 112 is translated through the trajectory path. In this way, advantageously, the location of the source 106 and the detector 108 can be known relative to one another. In alternative embodiments, as described above, the manipulating unit 104 can be configured to move the detector 108 in the X, Y and Z directions. The system herein can be configured to provide positions of the source 106 and the detector 108 that are known relative to one another. For example where the source 106 and the detector 108 are fixed relative to one another or where the source 106 and the detector 108 are translated together such their distance or positions relative to one another are known and fixed as they are translated together.

In some embodiments, the manipulating unit 104 can include a memory. The memory can be configured to store a number of predefined scanning paths corresponding to shape of the target object 112. The manipulating unit 104 can be configured to fetch the relevant scanning path from the memory and populate the scanning path for the source 106 by its own.

The source 106 can be configured to generate a beam and transmit the beam towards the ROI on the target object 112. In some embodiments, the source 106 can be an X-ray tube. In an embodiment, the width of the generated beam can be changed. In some embodiments, the position of the source 106 can change as a result of degradation of the system, such as thermal expansion, which can be seen as noise in the images generated if not properly compensated for, as described in greater detail below.

In some embodiments, the scanning unit 102 can be configured to communicate to the computing system 114 or a user computing device or a server over a network via the communication circuitry. Further, the communication circuitry transmits the generated scanning data over the network. In an embodiment, the network can be a private network, a dedicated network, a public network, a wired network, a wireless telecommunication network, a wireless wide area network (WWAN), a wireless local area network (WLAN), a wireless private network, and a wireless personal area network (PAN). In some embodiments, the communication circuitry may include at least one antenna for transmitting and receiving signals.

In some embodiments, the control unit can be configured to receive command signals from the user computing device or the server via the communication circuitry. Based on the received control signals, the control unit can be configured to generate a plurality of control signals to take appropriate action. For example, the user may intend to change the width of the beam. In such cases, after receiving the command signals, the control unit can send the control signal to the source for changing the width of the beam accordingly.

The computing system 114 can be communicably coupled to the scanning unit 102 and receive the scanning data from the scanning unit 102. In some embodiments, the computing system 114 can include a memory 116, an extracting unit 118, an image processor 120, and a display unit 122. The memory 116 can be configured to store received scanning data and the geometrical position and the orientation of the source corresponding to each of the plurality of source poses. In some embodiment, the memory 116 can be configured to store a set of rules for processing the received data. In one embodiment, the memory 116 may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The extracting unit 118 can be configured to fetch the scanning data from the memory 116. The image processor 120 can be communicably coupled to the extracting unit 118. The image processor 120 can be configured to reconstruct the 3D model of the ROI on the target object 112 from the scanning data, as will be discussed in greater detail below. In an embodiment, the image processor 120 can be configured to employ number of reconstruction algorithms such as a Feldkamp reconstruction algorithm, or the like, to reconstruct the 3D model of the target object 112 using the extracted pose information.

The display unit 122 can be configured to display the reconstructed 3D model of the target object 112. In some embodiments, the display unit 122 can be, for example, a CRT (cathode ray tube) or LCD (liquid crystal display) monitor, for displaying information to the user and a keyboard and a pointing device, (e.g., a mouse or a trackball), by which the user can provide input to the computer. In some embodiments, the display unit 122 can include a touchscreen.

Figure 2:
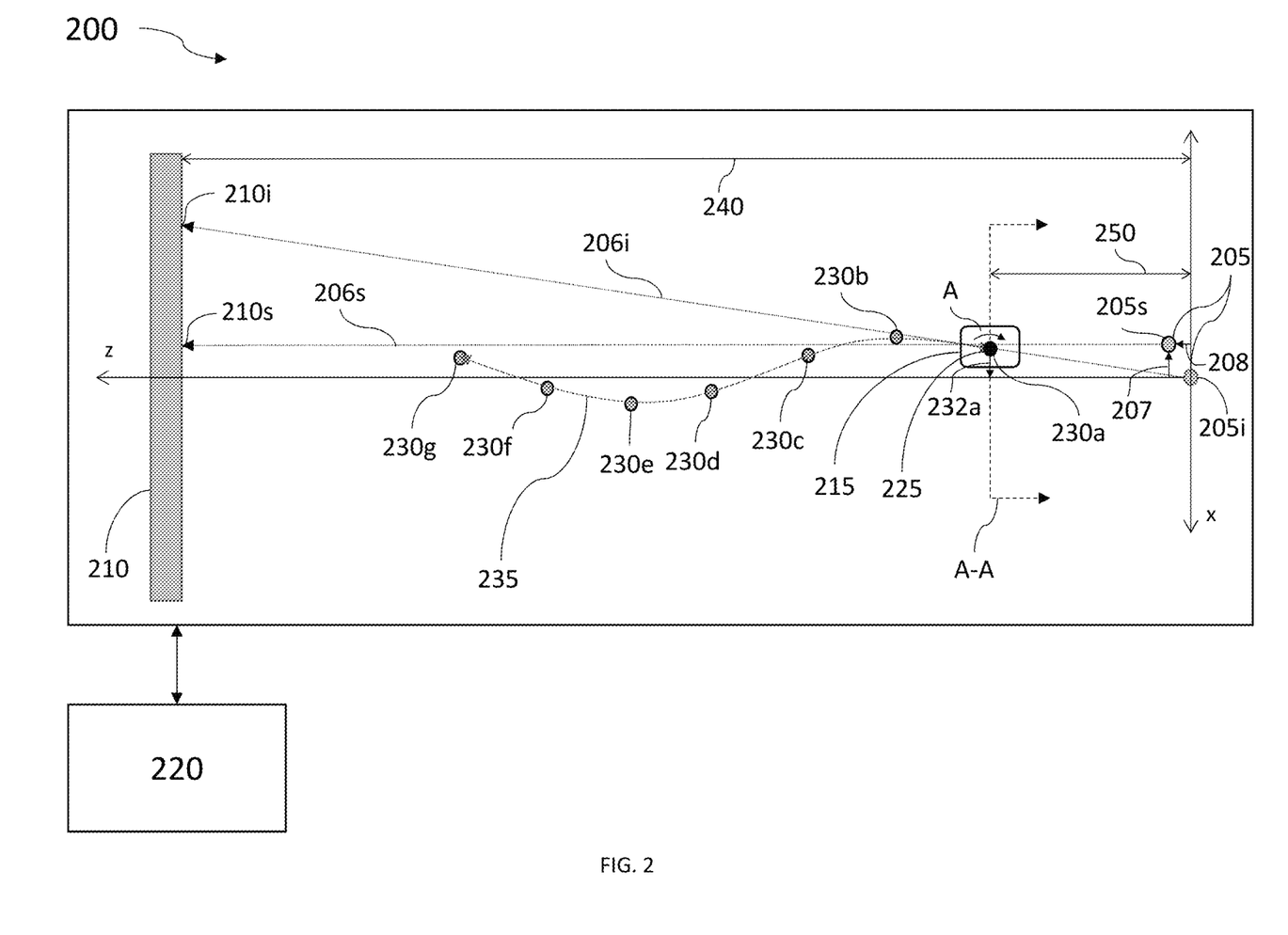
FIG. 2 is a diagram illustrating an example of a CT scanner for scanning an object according to subject matter described herein.

FIG. 2 is a diagram illustrating an example of a CT scanner 200 according to subject matter described herein. In some embodiments, the CT scanner 200 can include an x-ray emitter 205, a digital detector array (DDA) 210, a manipulating unit 215, and a computing system 220 (e.g., computing system 114 of FIG. 1) coupled to the CT scanner 200. In some embodiments, the emitter 205 can be configured to emit a fan or cone beam of x-rays toward the DDA 210. In an ideal case, the manipulating unit 215 would move the object 225 along a path defined by the z-axis such that the object 225 is moved in a straight line, however, in reality deviations from the ideal path occur due to a variety of factors. In some embodiments the path 235 can deviate from the ideal path in the x-direction, as illustrated, due to tolerances of the CT system 200 equipment and degradation of the CT system 200 over time. Such deviations can lead to non-linear movement of the manipulating unit 215, or the like. In some cases, the deviations in the x-direction can be on the order of micrometers, however, even deviations this small can result in noise in a CT image generated by the CT scanner 200. Accordingly, in reality, when the CT scanner 200 is initially calibrated, the manipulating unit 215 can be configured to move the object 225 through one or more positions (e.g., positions 230a-230g) along the path 235 in between the x-ray emitter 205 and the DDA 210. In some embodiments, the path 235 can be defined by a deviation between a rotational axis A of the manipulating unit 215 and the z-axis for each of one or more positions along the path 235 (e.g., deviation 232a). In some embodiments, the object 225 can be an object of interest. In some embodiments, the object 225 can be a calibration rod, as discussed in greater detail below.

Prior to delivering the CT scanner 200 to a customer, the manufacturer can characterize the path 235 in order to properly calibrate the CT scanner 200. In some cases, the path 235 can be defined by a function. In some cases, the path 235 can be determined by taking x-ray images of the object 225 at the one or more positions (e.g., positions 230a-230g) and determining the deviation (e.g., deviation 232a) from the z-axis at each of the one or more positions. In some embodiments, the object 225 can additionally be rotated about rotational axis A (located at point 230a) while capturing the x-ray images. In some embodiments, the deviation (e.g., deviation 232a) determined from the z-axis at each of the one or more positions can be defined as a number of pixels in a generated image that can be used to determine a level of compensation required to correct the deviation, as will be discussed in greater detail below. Further, in some cases, a central axis of the object 225 can be misaligned with the rotational axis A. In this case, the object 225 can be rotated lopsidedly, which can affect the clarity of a generated 3D CT image. Accordingly, in some embodiments, determining the deviation (e.g., deviation 232a) can further include acquiring a plurality of x-ray images of the object 225 at position 230a, as it is rotated about the rotational axis A, and using a correction technique (e.g., based on parallel rebinning) to correct for the lopsidedness produced by the misalignment of the central axis and the rotational axis A, as will be discussed in greater detail below. The accuracy of the determined compensation for the path 235 can depend on the frequency of positions (e.g., positions 230a-230g) at which the object 225 is scanned. By characterizing the path 235 and calibrating the CT scanner 200 prior to delivering the CT scanner 200 to the customer, the customer can be assured that the CT system will provide accurate images. However, as described above, the CT system 200 can shift over time, and the initial compensation can become insufficient.

For example, in some cases, the manufacturer can initially calibrate the CT scanner 200 based on an initial position 205i of the focal point of the x-ray emitter 205. In this case, for example, an x-ray beam 206i can leave the emitter 205 at positon 205i, pass through the center of the object 225 at position 230a, and contact the detector at a position 210i. However, over time the focal point of the x-ray emitter 205 can change as a result of thermal expansion, an x-ray tube switch, a filament change, mechanical vibration, a change in the angle of the emitter, etc. Thermal expansion is the phenomenon in which an object expands or contracts as its temperature changes. Accordingly, thermal expansion in the x-ray emitter 205 of the CT scanner 200 can affect the accuracy of the scanner because the angle at which the x-ray beam is leaving the emitter 205 and contacting the DDA 210 can change, which can affect the how the computing system 220 interprets the beams. For example, the focal point may shift from the initial position 205i to the shifted position 205s, with a shift 207 in the x-direction, and a shift 208 in the z-direction. It should be noted the distance 240 between the x-ray emitter 205 and the DDA 210 is much larger than the shift of the emitter 205. Accordingly, it is assumed that any shift 208 of the emitter 205 in the z-direction is negligible in the calibration operation described herein. Accordingly, in some embodiments, the only component of the focal point shift from the position 205i to position 205s that is used in the calibration operation is the shift 207 of the emitter 205 in the x-direction.

In this case, for example, an x-ray beam 206s can leave the emitter 205 at positon 205s, pass through the center of the object 225 at position 230a, and contact the detector at a position 210s. Accordingly, in the illustrative example provided, it can be understood that even a small focal point shift of the emitter 205 can result in large changes to the scans that are used to prepare three-dimensional CT images. If not properly calibrated for, the above described focal points shift can render a CT scanner 200 inoperable.

As discussed above, in some embodiments, the manufacturer can initially calibrate the CT scanner 200 to compensate for the deviations (e.g., deviation 232a) to ensure accuracy of the scanner upon delivery to a customer. To initially calibrate the scanner, the CT scanner 200 can take a plurality of x-ray images of the object 225 at the one or more initial positions 230a-230g. In some embodiments, the CT scanner 200 can also rotate the object 225 about rotational (i.e., axis A). The CT scanner 200 can transmit these x-ray images to the computing system 220, and the computing system can determine a compensation value or a compensation vector based on the path 235 and the x-ray images. The compensation value or a compensation vector can be configured to correct these deviations from the z-axis at each of the one or more initial positions. In some embodiments, the compensation value or a compensation vector can be determined based on the path 235, the initial position 205i of the x-ray emitter 205 and a distance 240 between the x-ray emitter 205 and the DDA 210.

As the customer uses the CT scanner 200, the focal point of the x-ray emitter 205 can change as a result of, for example, thermal expansion, which can affect the accuracy of the CT images generated by the CT scanner 200, if the CT scanner 200 is not properly calibrated. Accordingly, it can be desirable for a customer to be able to easily and routinely calibrate the CT scanner 200 by determining an updated compensation value or a compensation vector, to ensure accuracy of the CT images provided. A routine calibration operation using only a single position along the path 235 is described below in reference to FIG. 3.

Figure 3:
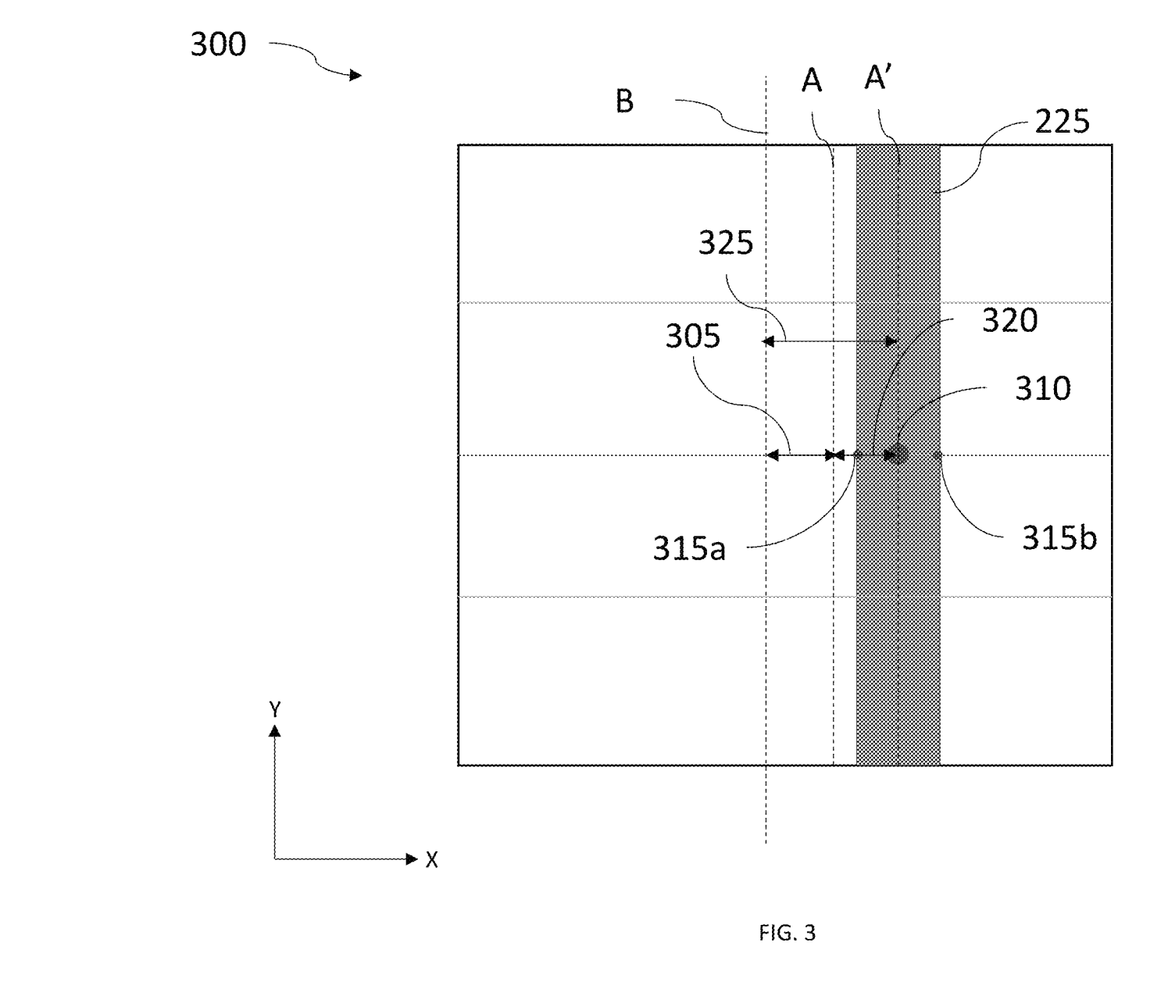
FIG. 3 illustrates a exemplary x-ray image of the object of FIG. 2 that can be generated from the CT scanner of FIG. 2.

FIG. 3 illustrates an exemplary x-ray 300 of the object 225 that can be generated from the CT scanner 200 at position 230a of the one or more positions (e.g., positions 230a-230g) when the x-ray emitter has shifted from its initial position 205i to shifted position 205s. For simplicity, in the image 300 of FIG. 3, it can be assumed that the central axis of the object 225 (e.g., a calibration rod) is aligned with axis of rotation A. More complex cases will be discussed in greater detail below. The image 300 can be used to calibrate the CT scanner 200 based on the x-ray emitter shift, although it should be noted that any position of the one or more shifted positions can be used for the calibration operation described herein. The x-ray images of FIG. 3 can be an image of the object 225 as seen from section A-A of FIG. 2. In image 300, axis B corresponds to a line extending along the y-axis through the z-axis of FIG. 2 at the distance 250. Axis A corresponds to the axis A of FIG. 2, which illustrates the rotational axis of the object 225 (extending along the y-axis through the initial position 230b at the distance 250 of FIG. 2). A deviation 305 between axis A and axis B can be determined by the manufacturer at the time of the initial calibration, and can be characterized by the initial path 235 of FIG. 2, based on an image taken when the x-ray emitter was in its initial position 205i of FIG. 2. Axis A' corresponds to the shifted rotational axis of the object 225 based on a focal point shift (e.g., the shifted position 205'). The axis A' can be configured to extend along the y-axis through a center 310 of the object 225 at the position 230b' at the distance 250 of FIG. 2. In some embodiments, the computing system 220 can determine the center 310 of the object 225 by determining edges 315a and 315b of the object 225. In some embodiments, the computing system 220 can automatically detect the edges 315a and 315b. Alternatively, in some embodiments, the edges 315a and 315b can be selected by a user, for example, by providing an input to a user interface display (e.g., display unit 122 of FIG. 1) coupled to the computing system 220 configured to display the image 300. The computing system 225 can be configured to determine the center 310 of the object 225 as a middle point between the determined edges 315a and 315b. Based on the determination of the center 310, the computing system can be configured to determine a deviation 320 between axis A and axis A'. Accordingly, a deviation 325, between axis A' and axis B can be defined as a sum of the deviation 305 and 320.

Figure 4:
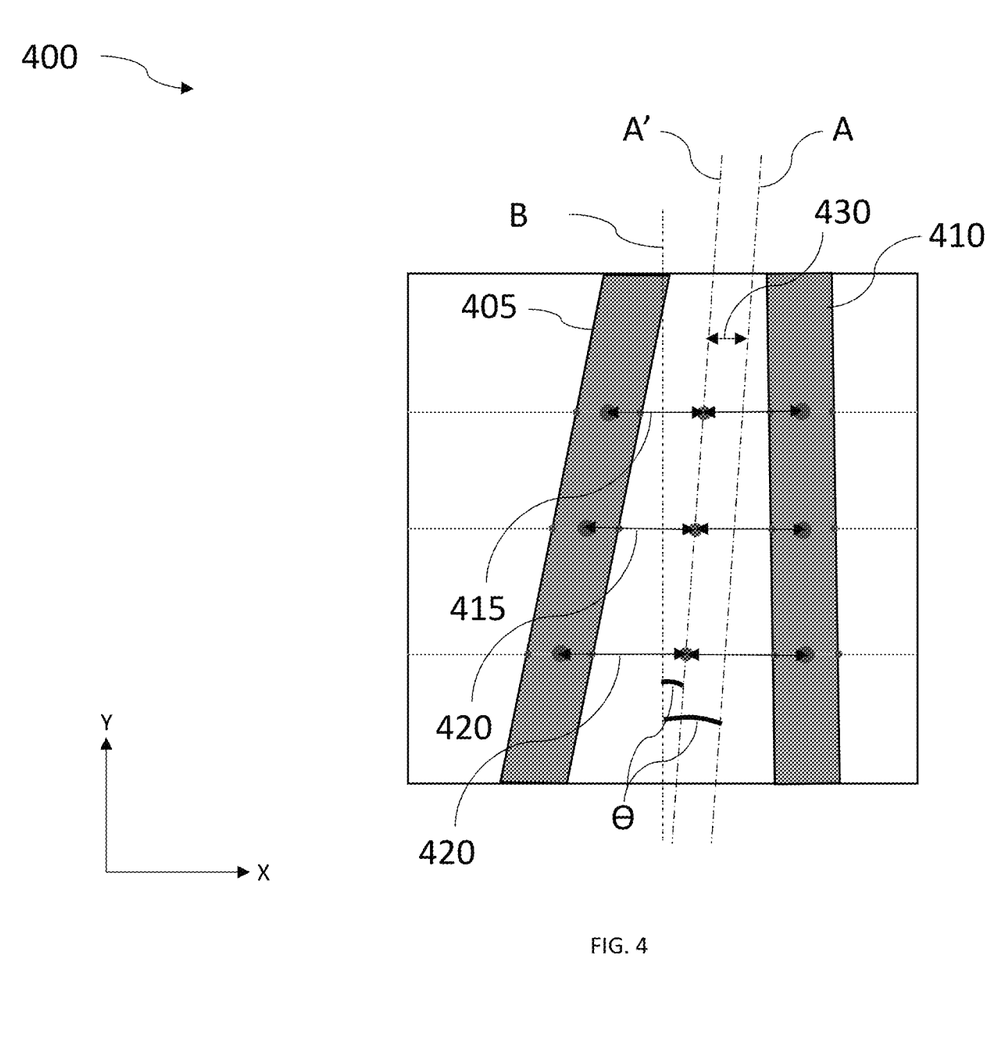
FIG. 4 illustrates an exemplary overlay of x-ray images of the object of FIG. 2 that can be generated from the CT scanner of FIG. 2.

Alternatively, in some embodiments, the center 310 can be determined using a parallel rebinning technique. As discussed above in reference to FIG. 2, the x-ray emitter 205 can be configured to emit a fan or cone beam of x-rays toward the DDA 210. Accordingly, the beams transmitted are not parallel, but in reality, diverge from one another. Parallel rebinning is a process that involves approximating the fan or cone beam emitted from the emitter 205 to be parallel beams. In some embodiments, this can be done by grouping the fan or cone beams into parallel beams based on their angles of incidence. Once the fan or cone beams are rebinned, they can be used to generate a 2D representation (e.g., image 300) of the x-ray attenuation properties of the object 225. In some embodiments, the 2D representation can be created by summing the rebinned projection data along parallel lines at different angles. Using the 2D representation, the center 310 of the object 225 can be estimated by analyzing the distribution of the 2D representation values along each projection line. The center 310 of the object can be determined as a centroid of the 2D representation In some embodiments, the object 225 can be tilted about the y-axis at the time of manufacture. Additionally, in some embodiments, the axis of rotation of the object 225 can be misaligned with the central axis of the object 225. Accordingly, FIG. 4 illustrates an exemplary overlay 400 of a plurality of x-ray images of the object 225 that can be generated from the CT scanner 200 at position 230a of the one or more positions (e.g., positions 230a-230g) when the x-ray emitter has shifted from its initial position 205i to shifted position 205s. In the overlay 400, the object 225 is tilted and misaligned with the axis of rotation of the object 225. For example, the overlay 400 can in include a first x-ray image 405 taken of the object 225 at an angular orientation of 0 degrees along the rotational path around shifted axis A'. Additionally, the overlay 400 can in include a second x-ray image 410 taken of the object 225 at an angular orientation of 180 degrees along the rotational path around shifted axis A'. The overlay 400 can be used to calibrate the CT scanner 200 based on the x-ray emitter shift, although it should be noted that any position of the one or more shifted positions can be used for the calibration operation described herein. In overlay 400, axis B corresponds to a line extending along the y-axis through the z-axis of FIG. 2 at the distance 250. Axis A corresponds to the axis A of FIG. 2 based on an image taken when the x-ray emitter was in its initial position 205i of FIG. 2. Axis A of FIG. 4 can be tilted at an angle θ relative to axis B. Axis A' corresponds to the shifted rotational axis of the object 225 based on a focal point shift (e.g., the shifted position 205').

During the initial calibration, the computing system can be configured to determine the axis A similarly as described above in reference to FIG. 3. The computing system 220 can be configured to determine the axis A by determining the edges of the object 225 at a first elevation 415, the edges of the object 225 at a second elevation 420, and the edges of the object 225 at a third elevation 425. Accordingly, the deviation of the axis A from axis be can be determined as a function of elevation, which can be derived from the edge determinations described above. For example, in some embodiments, the computing system 220 can be configured to determine the angle of the tilt θ of the object 225 about the y-axis geometrically, using the Axis B and the Axis A. In some embodiments, the angle of the tilt θ can be determined using the dot product of the vector defined by the axis B (e.g., the y-axis) and the vector defined by axis A.

As a result of focal point shift, as described above, the rotational axis of the object 225, as perceived by the detector, can shift a distance 430, from axis A to Axis A'. Axis A' can also be tilted at an angle θ relative to axis B. Axis A' can be determined similarly to the determination of axis A, as described above. Accordingly, axis A' can also be a vector, and a deviation between axis A' and axis B can be defined as the deviation of axis A to axis B, as function of elevation, plus the shifted distance 430.

Further, the overlay 400 can in include a first x-ray image 410 taken of the object 225 at an angular orientation of 0 degrees along the rotational path around shifted axis A'. Additionally, the overlay 400 can in include a second x-ray image 420 taken of the object 225 at an angular orientation of 180 degrees along the rotational path around shifted axis A'. The first and second x-ray images 410, 420 can illustrate the misalignment between the central axis of the object 225 and the shifted rotational axis A', which can produce a lopsided rotation that needs to be compensated for in order to produce a clear 3D CT image of the object 225. The computing system 220 can be configured to determine a plurality of center points of the object 225 in the first image 405 similarly to as described above in reference to FIG. 3. Further, the computing system 220 can be configured to determine a plurality of center points of the object 225 in the second image 410 similarly to as described above in reference to FIG. 3. Accordingly, the misalignment of the central axis of the object 225 and the rotational axis A' can be compensated for using parallel rebinning, as described above.

Figure 5:
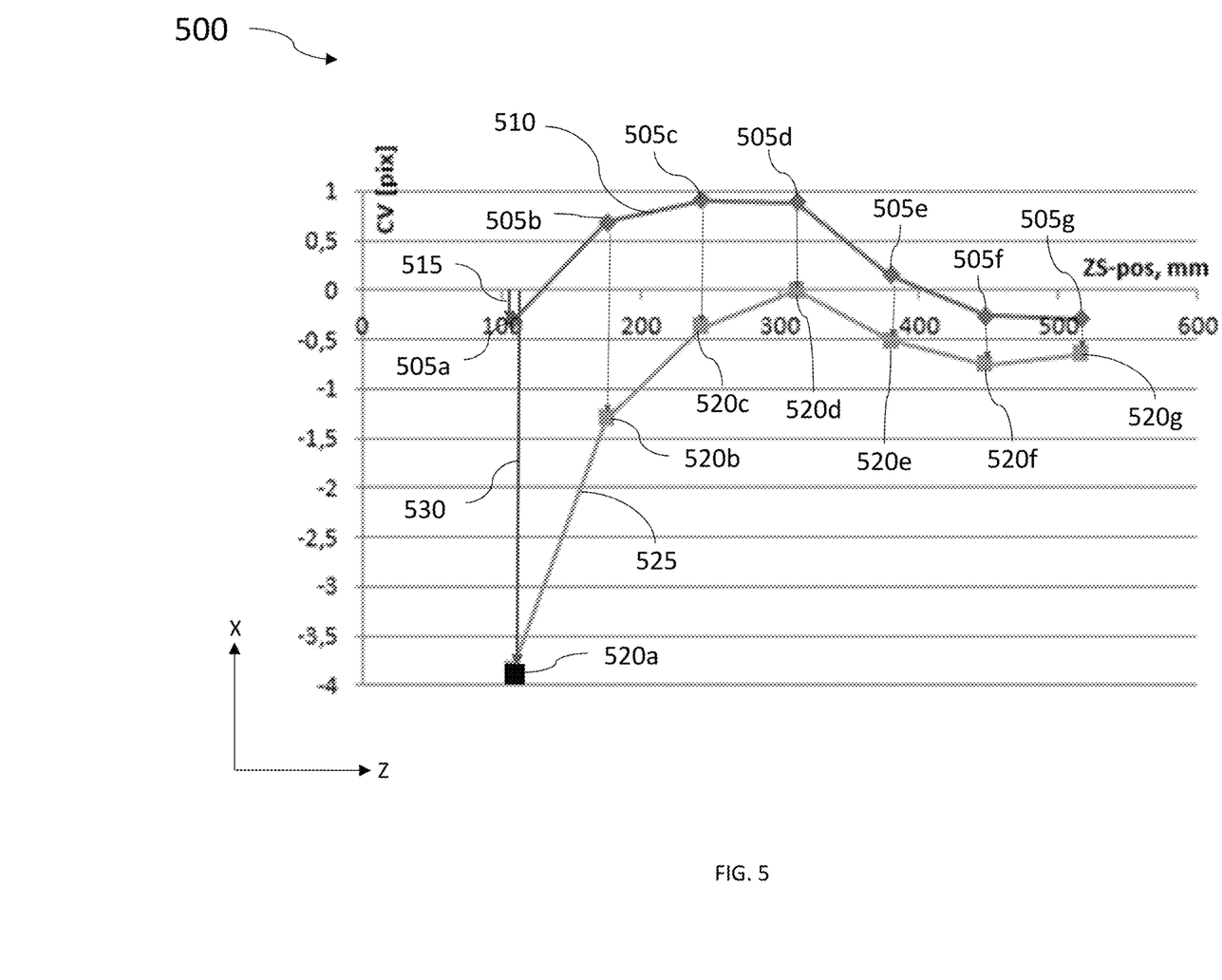
FIG. 5 is a graph illustrating a compensation operation for correcting for deviations in a CT scanner moving an object along a path by only scanning an object at a single position, according to subject matter described herein.

FIG. 5 is a graph 500 illustrating a compensation operation for correcting for deviations in a CT scanner moving an object along a path by only scanning an object at a single position. As illustrated in FIG. 5 a plurality of initial deviations 505a-505g can correspond to a plurality of deviations of an object moving along an initial path 510. For example, the initial plurality of deviations 505a-505g can correspond to deviations determined for the plurality of positions 230a-230g of FIG. 2, based on a plurality of scans taken of the object 225 while the x-ray emitter 205 is in the initial position 205i. As illustrated in FIG. 5, for example, a distance 515 can correspond to the initial deviation 505a, which can be determined as a deviation of −0.3 pixels in the x-direction from the z-axis for one or more scans taken a position 105 mm from the x-ray emitter (e.g., x-ray emitter 205 of FIG. 2) in the z-direction. Initially, when the emitter is in the initial position, the computing system (e.g., computing system 220) can be configured to use the initial path 510 to interpolate a necessary compensation for any position along the z-axis at which a scan of the object is taken. However, as the emitter shifts from the initial position due to, for example, thermal expansion, using the initial path 510 for compensation can become inaccurate. Furthermore, executing a brand new calibration for all of the positions (e.g., positions 230*a*-230*g* of FIG. 2) based on the shifted position of the emitter can be cumbersome for a user, if not impossible.

Accordingly, graph 500 illustrates a compensation operation for correcting for deviations based on a shifted position (e.g., shifted position 205*s*) of the emitter using the initial path 510. The compensation operation described herein advantageously only required a user to scan the object a single position of the plurality of positions 230*a*-230*g*. For example, as illustrated in FIG. 5, a single scan can be taken of the object at the position (e.g., position 230*a* of FIG. 2) with the emitter in the shifted position, which corresponds to a shifted deviation 520*a* of a plurality of shifted deviations 520*a*-520*g* along a shifted path 525. As illustrated in FIG. 5, it can be determined that a the shift of the emitter from initial position 205*i* to shifted position 205*s* results in a shifted deviation 520*a*, which is illustrated by a distance 530 of −3.75 pixels in the x-direction from the z-axis. Using the shifted deviation 520*a*, the initial deviation 505*a*, a distance (in the z-direction) between the x-ray emitter and the DDA (e.g., distance 240 of FIG. 2), and a distance (in the z-direction) between the object and the x-ray emitter (e.g., distance 250 of FIG. 2), the computing system 220 can be configured to determine a focal point shift of the emitter in the x-direction. It should be noted, as described above that it is assumed that any shift of the emitter in the z-direction is negligible in the calibration operation, due to the fact that the distance between the x-ray emitter and the DDA is much larger than the shift of the emitter. An example of an equation that can be used to determine the focal point shift of the emitter from an initial position to a shifted position can be seen below in Equation 1:

$$CVs = CVi + FS\left(1 - \frac{FDD}{z}\right) \quad (1)$$

In the equation provided above, CVs corresponds to the compensation value (a number of pixels in the x-direction) that is necessary for proper calibration of the CT scanner for a given position along the shifted path 525. Similarly, CVi corresponds to the initial compensation value (a number of pixels in the x-direction) for a given position along the initial path 510 that is determined by the manufacturer as necessary for proper calibration of the CT scanner. FS represents a measure of focal point shift (a distance in the x-direction) of the emitter. FDD represents a distance (in the z-direction) between the x-ray emitter and the DDA (e.g., distance 240 of FIG. 2). For example, in FIG. 5, the distance FDD can be 600 mm. z represents a distance (in the z-direction) between the object and the x-ray emitter (e.g., distance 250 of FIG. 2) at each position along the path 525. It should be noted that the positions of each of the initial deviations 505*a*-505*g* along the z-axis are equivalent to the positions of each of the shifted deviations 520*a*-520*g* along the z-axis.

Once the FS is determined using Equation 1 and the CVs value determined from the single scan at position 230*a*, Equation 1 can be used with the FS value to interpolate the CVs value for any position along shifted path 525 using the FS value and the initial path 510.

Additionally, in the case described above in reference to FIG. 4, the rotational axis of the object can be tilted at with respect to a vertical direction. The angle of tilt can vary as a function of position along the path, similarly to the CVs values. Accordingly, in some embodiments, the CVs values determined above can each be vector values that change as a function of vertical position (e.g., position along the y-axis of FIG. 4) as described above.

Figure 6:
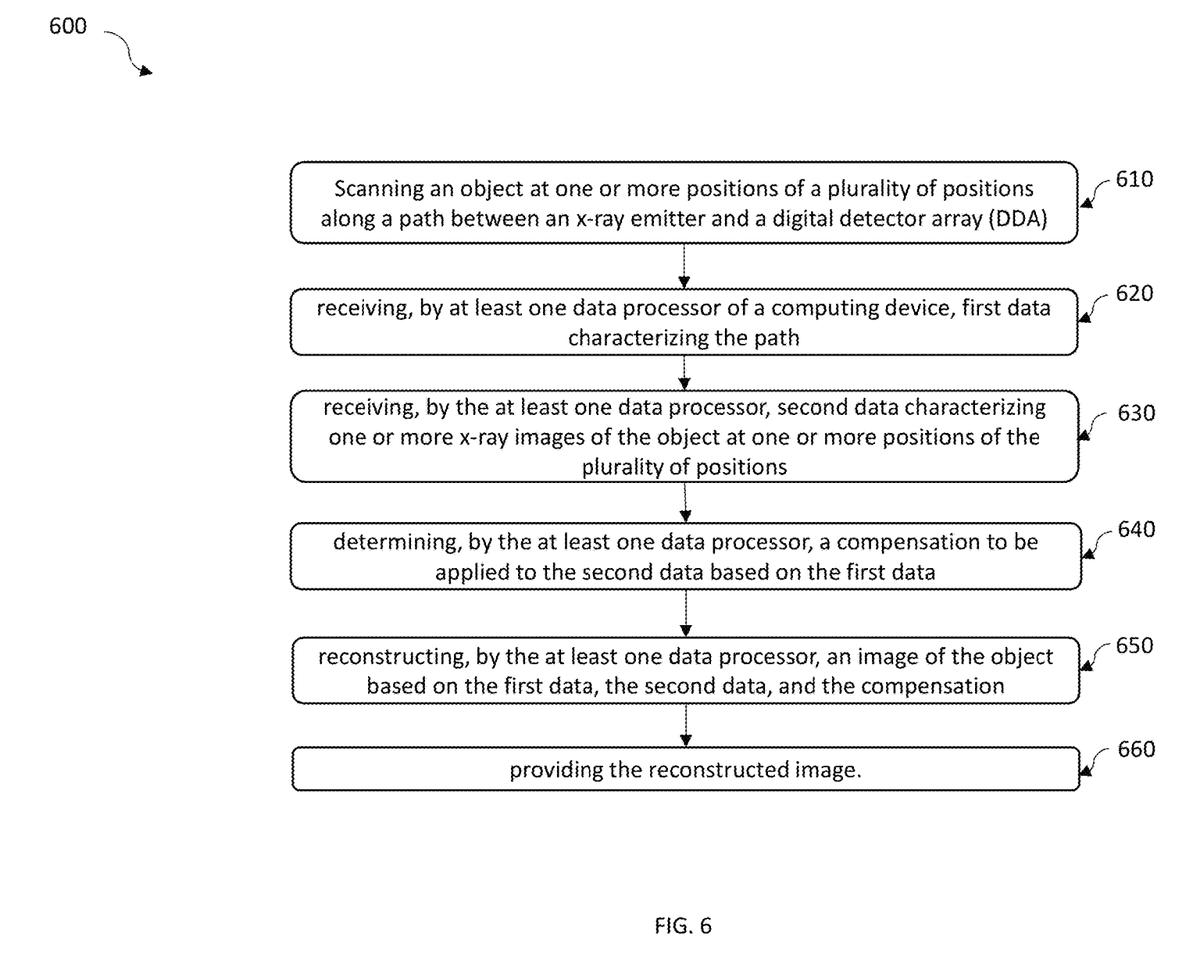
FIG. 6 illustrates an example of a method for automatically determining and compensating for a change in a focal spot position of an emitter of a CT scanner as described herein.

FIG. 6 illustrates an example of a method 600 for automatically determining and compensating for a change in a focal spot position of an emitter of a CT scanner as described herein. In some embodiments, the method 600 can include a step 610 of scanning, by a scanning unit an object at a first position of one or more positions along a path between an x-ray emitter and a digital detector array (DDA). A manipulating unit can be configured to rotate the object about a rotational axis and move the object along the path. In some embodiments, the scanning unit can be similar to the CT scanner 200 of FIG. 2 including the x-ray emitter 205, the DDA 210, and the manipulating unit 215. Similarly, the object can be similar to the object 225 of FIG. 2 being scanned at the first position 230*a* along the path 235.

In some embodiments, the method 600 can include a step 620 of receiving, by at least one data processor of a computing device (e.g., image processor 120 of computing system 114 of FIG. 1) first data characterizing the path. In some embodiments, the path can be defined by coordinates in three-dimensional space. The computing device can be coupled to the scanning unit and can include a memory storing computer-executable instructions. In some embodiments, the processor (e.g., image processor 120) can be configured to receive the first data from the memory of the computing device (e.g., memory 116 of computing system 114).

In some embodiments, the method 600 can include a step 630 of receiving, by at least one data processor of a computing device (e.g., image processor 120 of computing system 114 of FIG. 1) second data characterizing one more scans of the object at the first position of the one or more positions. In some embodiments, the one more scans of the object can include a plurality of scans taken as the object is rotated about the rotational axis (e.g., as object 225 is rotated about axis A, in reference to FIG. 2). The second data characterizing can include information about the x-ray projections acquired during the scanning process. In some embodiments, the second data can also include data characterizing a distance between the x-ray emitter and the DDA and a distance between the first position and the x-ray emitter.

In some embodiments, the method 600 can include a step 640 of determining, by at least one data processor of a computing device (e.g., image processor 120 of computing system 114 of FIG. 1) a compensation to be applied to the second data based on the first data. In some embodiments, the compensation can be measured as a number of pixels that the second data deviated from the path defined by the first data at the one or more positions.

In some embodiments, the determining of the compensation can further include determining a shifted position of the object corresponding to the first position of the object, as described above in relation to FIG. 3. In some embodiments, the shifted position can be a scalar value, however, in some embodiments, the shifted position can be a vector value, as described above in relation to FIG. 4. In some embodiments, the shifted position can be determined using a parallel rebinning technique on the second data. As described above, parallel rebinning is a process that involves approximating the second data resulting from the divergent beams into parallel projection data. In some embodiments, this can be done by grouping the second data into parallel beams based on their angles of incidence. Once the second data is rebinned, it can be used to generate a 2D representation (e.g., sonogram) of the x-ray attenuation properties of the object (e.g., object 225 of FIG. 2). In some embodiments, the 2D representation can be created by summing the rebinned projection data along parallel lines at different angles. Using the 2D representation, the center of the object (e.g., object 225 of FIG. 2) can be estimated by analyzing the distribution of the 2D representation values along each projection line. The center of the object can be determined as a centroid of the 2D representation.

In some embodiments, the method 600 can include a step 650 of reconstructing, by at least one data processor of a computing device (e.g., image processor 120 of computing system 114 of FIG. 1) a three-dimensional image of the object by applying the determined compensation to the first data. In some embodiments, the processor can be configured to employ number of reconstruction algorithms such as a Feldkamp reconstruction algorithm, or the like, to reconstruct the 3D image of the object using the plurality of scans taken as the object is rotated about the rotational axis. In some embodiments, the processor can be configured to determine an image quality metric from the reconstructed image. For example, in some embodiments, the image quality metric can be an indication of an image resolution or sharpness. In some embodiments, the computing system can be configured to further determine a compensation and or and updated compensation based on the image quality metric determined.

In some embodiments, the method 600 can include a step 660 of providing the reconstructed image. In some embodiments, the image can be provided to a display unit (e.g., display unit 122 of FIG. 1). For example, in some embodiments, the display unit can be a CRT (cathode ray tube) or LCD (liquid crystal display) monitor, for displaying information to the user and a keyboard and a pointing device, (e.g., a mouse or a trackball), by which the user can provide input to the computer. In some embodiments, the display unit can include a touchscreen.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A system comprising:
    a scanning unit comprising
        an x-ray emitter;
        a detector configured to receive x-rays emitted from the x-ray emitter during a scanning operation; and
        a manipulating unit configured to rotate an object about a rotational axis and move the object through a plurality of positions along a path, defined by the rotational axis, in between the x-ray emitter and the detector, while capturing one or more x-ray images of the object; and
    a computing device, including a memory storing computer-executable instructions and at least one data processor, wherein the at least one data processor is configured to execute the instructions, which cause the at least one data processor to perform operations comprising:
        receiving, from the scanning unit, first data characterizing the path;
        receiving, from the scanning unit, second data characterizing one or more x-ray images of the object at one or more positions of the plurality of positions;
        determining a deviation of the first data from an idealized path based on the first data and the second data;
        determining a compensation to be applied to the second data based on the deviation;
        reconstructing an image of the object based on the first data, the second data, and the compensation; and
        providing the reconstructed image.

2. The system of claim 1, wherein the first data further includes data characterizing a distance between the x-ray emitter and the detector and at least one distance between the one or more positions and the x-ray emitter, and at least one data processor is further configured to perform operations comprising:
    determining a shift of the x-ray emitter based on the first data, and the second data; and
    determining the compensation to be applied to the first data based on the first data, the second data and the shift of the x-ray emitter.

3. The system of claim 1, wherein the detector is a digital detector array.

4. The system of claim 1, wherein the one more x-ray images of the object at the one or more positions include a plurality of x-ray images, and the at least one data processor is further configured to perform operations comprising:
    determining, from the second data, one or more shifted positions of the object corresponding to the one or more positions of the object using a parallel rebinning; and
    determining the compensation to be applied to the second data based on the first data and the one or more shifted positions.

5. The system of claim 4, wherein the plurality of positions along the path are defined by coordinates in three-dimensional space, further wherein the at least one shifted position is a vector.

6. The system of claim 1, wherein the object is a calibration rod and the first data further includes data characterizing an initial angular orientation of the rotational axis at the plurality of positions along the path, and the at least one data processor is further configured to perform operations comprising:
    determining a shifted angular orientation of the rotational axis;
    determining, based on the first data, the second data and the shifted angular orientation, a plurality of shifted positions at a plurality locations along the shifted angular orientation of the rotational axis; and
    determining the compensation to be applied to the second data based on the first data, the shifted angular orientation of the rotational axis and the plurality of shifted positions.

7. The system of claim 6, wherein the plurality of positions along the path are defined by coordinates in three-dimensional space, further wherein the at least one shifted position is a vector.

8. The system of claim 1, wherein the at least one data processor is further configured to perform operations comprising:

determining, based on the reconstructed image, an image quality metric; and determining an updated compensation to be applied to the first data based on the image quality metric.

9. A method comprising:

scanning, by a scanning unit, an object at one or more positions of a plurality of positions along a path between an x-ray emitter and a detector, wherein the scanning unit includes the x-ray emitter, the detector, and a manipulating unit configured to rotate the object about a rotational axis and move the object through the plurality of positions along a path, defined by the rotational axis, in between the x-ray emitter and the detector, while capturing one or more x-ray images of the object;

receiving, by at least one data processor of a computing device coupled to the scanning unit and including a memory storing computer-executable instructions, first data characterizing the path;

receiving, by the at least one data processor, second data characterizing one or more x-ray images of the object at one or more positions of the plurality of positions;

determining, by the at least one data processor, a deviation of the first data from an idealized path based on the first data and the second data;

determining, by the at least one data processor, a compensation to be applied to the second data based on the deviation;

reconstructing, by the at least one data processor, an image of the object based on the first data, the second data, and the compensation; and providing the reconstructed image.

10. The method of claim 9, wherein the one more x-ray images of the object at the at least one position include a plurality of x-ray images, the determining of the compensation further comprising:

determining, by the at least one data processor, from the first data and the second data, one or more shifted positions of the object corresponding to the one or more positions of the object using a parallel rebinning; and determining, by the at least one data processor, the compensation to be applied to the first data based on the first data, the second data and the one or more shifted positions.

11. The method of claim 9, wherein the first data further includes data characterizing a distance between the x-ray emitter and the detector and at least one distance between the at least one position and the x-ray emitter, the determining of the compensation further comprising:

determining, by the at least one data processor, a shifted position of the x-ray emitter based on the at least one shifted position of the object corresponding to the at least one position and the second data;

determining, by the at least one data processor, the compensation to be applied to the first data based on the first data, the second data and the shift of the x-ray emitter.

12. The method of claim 9, wherein the object is a rod and the first data further includes data characterizing an initial angular orientation of the rotational axis at the plurality of positions along the path, and the at least one data processor is further configured to perform operations comprising:

determining, by the at least one processor, a shifted angular orientation of the rotational axis;

determining, by the at least one processor, based on the first data, the second data and the shifted angular orientation, a plurality of shifted positions at a plurality of locations along the shifted angular orientation of the rotational axis; and determining the compensation to be applied to the second data based on the first data, the shifted angular orientation of the rotational axis and the plurality of shifted positions.

13. The method of claim 12, wherein the one or more positions along the path are defined by coordinates in three-dimensional space, further wherein the at least one shifted position is a vector.

14. The method of claim 9, wherein the detector is a digital detector array.

15. The method of claim 9, further comprising:

determining, by the at least one processor, based on the reconstructed image, an image quality metric; and determining, by the at least one processor, an updated compensation to be applied to the first data based on the image quality metric.

16. A non-transitory computer readable medium storing computer readable instructions, which when executed by a data processor cause the data processor to perform operations comprising:

receiving first data characterizing a path of an object from a scanning unit, wherein the scanning unit includes an x-ray emitter, a detector, and a manipulating unit configured to rotate the object about a rotational axis and move the object through a plurality of positions along the path, defined by the rotational axis, in between the x-ray emitter and the detector, while capturing one or more x-ray images of the object;

receiving second data, from the scanning unit, characterizing one or more x-ray images of the object at one or more positions of the plurality of positions;

determining a deviation of the first data from an idealized path based on the first data and the second data;

determining a compensation to be applied to the second data based on the deviation;

reconstructing an image of the object based on the first data, the second data, and the compensation; and providing the reconstructed image.

17. The non-transitory computer readable medium of claim 16, wherein the first data further includes data characterizing a distance between the x-ray emitter and the detector and a distance between the first position and the x-ray emitter, and the computer readable instructions further cause the at least one data processor to perform operations comprising:

determining a shift of the x-ray emitter based on the first data, and the second data; and determining the compensation to be applied to the first data based on the first data, the second data and the shift of the x-ray emitter.

18. The non-transitory computer readable medium of claim 16, wherein the one more x-ray images of the object at the at least one position include a plurality of x-ray images, and the computer readable instructions further cause the at least one data processor to perform operations comprising:

determining, from the first data and the second data, one or more shifted positions of the object corresponding to the one or more positions of the object using a parallel rebinning; and determining the compensation to be applied to the first data based on the first data, the second data and the one or more shifted positions.

19. The non-transitory computer readable medium of claim 16, wherein the object is a rod and the first data further includes data characterizing an initial angular orientation of the rotational axis at the plurality of positions along the path, and the computer readable instructions further cause the at least one data processor to perform operations comprising:
- determining a shifted angular orientation of the rotational axis;
- determining, based on the first data, the second data and the shifted angular orientation, a plurality of shifted positions at a plurality locations along the shifted angular orientation of the rotational axis; and
- determining the compensation to be applied to the second data based on the first data, the shifted angular orientation of the rotational axis and the plurality of shifted positions.

20. The method of claim 19, wherein the one or more positions along the path are defined by coordinates in three-dimensional space, further wherein the at least one shifted position is a vector.

* * * * *